US011760471B2

(12) United States Patent
Villard

(10) Patent No.: US 11,760,471 B2
(45) Date of Patent: Sep. 19, 2023

(54) DRONE PROPELLER APPARATUS

(71) Applicant: Dave Villard, Hyattsville, MD (US)

(72) Inventor: Dave Villard, Hyattsville, MD (US)

(*) Notice: Subject to any disclaimer, the term of this patent is extended or adjusted under 35 U.S.C. 154(b) by 823 days.

(21) Appl. No.: 16/741,726

(22) Filed: Jan. 13, 2020

(65) Prior Publication Data

US 2020/0223539 A1 Jul. 16, 2020

Related U.S. Application Data

(60) Provisional application No. 62/791,439, filed on Jan. 11, 2019.

(51) Int. Cl.
| | |
|---|---|
| *B64C 25/02* | (2006.01) |
| *B64C 27/473* | (2006.01) |
| *B64C 27/80* | (2006.01) |
| *B64C 39/02* | (2023.01) |
| *F04D 25/02* | (2006.01) |
| *B64U 10/13* | (2023.01) |
| *B64U 30/20* | (2023.01) |
| *B64U 50/19* | (2023.01) |

(52) U.S. Cl.
CPC ............ *B64C 27/80* (2013.01); *B64C 27/473* (2013.01); *B64C 39/024* (2013.01); *F04D 25/026* (2013.01); *B64U 10/13* (2023.01); *B64U 30/20* (2023.01); *B64U 50/19* (2023.01)

(58) Field of Classification Search
CPC ......... B64C 11/20; B64C 11/46; B64C 11/48; B64C 27/10; B64C 27/80; B64C 27/473; B64C 39/024; B64C 2201/027; B64C 2201/042; B64C 2201/108; F04D 25/026
USPC ...................................................... 417/410.1
See application file for complete search history.

(56) References Cited

U.S. PATENT DOCUMENTS

| | | | | |
|---|---|---|---|---|
| 7,942,627 B2 * | 5/2011 | Jin | ........................ | F04D 29/542 415/209.1 |
| 7,946,804 B2 * | 5/2011 | Yoshida | ................ | F04D 29/542 415/60 |
| 9,815,552 B1 * | 11/2017 | Welsh | .................... | B64C 39/062 |
| 11,292,588 B1 * | 4/2022 | Pope | ...................... | H02K 21/24 |
| 2017/0217566 A1 * | 8/2017 | Ichinose | ............... | B64C 39/024 |
| 2018/0044029 A1 * | 2/2018 | Koegler | .................... | B64F 5/10 |
| 2019/0168866 A1 * | 6/2019 | Tovkach | ................. | B64C 27/50 |
| 2019/0319415 A1 * | 10/2019 | Wishart | ............... | H02K 13/003 |
| 2020/0223539 A1 * | 7/2020 | Villard | .................... | B64C 27/20 |
| 2020/0391848 A1 * | 12/2020 | Shi | .......................... | B64C 39/06 |
| 2021/0114740 A1 * | 4/2021 | Berkey | .................... | B64C 11/06 |

(Continued)

FOREIGN PATENT DOCUMENTS

CN 113104204 A * 7/2021 ............. B64C 17/02

*Primary Examiner* — Joshua E Rodden

(74) *Attorney, Agent, or Firm* — Law Office of Jerry Joseph, PLC; Jerry Joseph

(57) ABSTRACT

A multi-propeller assembly for a drone, the multi-propeller includes a housing, a motor coupled having a circular cavity surrounded by a plurality of magnets disposed at the opposing second side of the housing, a first, second, and third three-bladed propeller having drive members rotatably coupled within the circular cavity of the motor and nested within each other, wherein the motor is configured to simultaneously rotate the first and third three-bladed propeller in a first direction and the second three-bladed propeller in an opposite second direction using the plurality of magnets.

5 Claims, 14 Drawing Sheets

(56) References Cited

U.S. PATENT DOCUMENTS

2022/0140710 A1* 5/2022 Wishart .................. B64C 11/48
  310/75 R
2022/0161926 A1* 5/2022 Duffy .................. B64C 29/0025

* cited by examiner

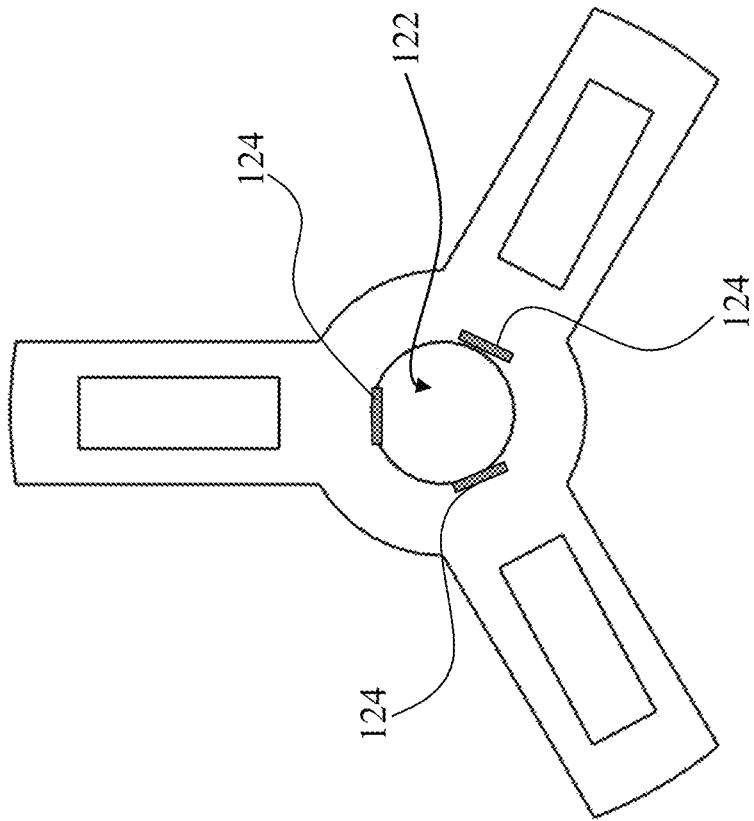

DRONE PROPELLER APPARATUS

BACKGROUND OF THE INVENTION

1. Field of the Invention

The present general inventive concept relates to a drone propeller apparatus, and more particularly, to a drone propeller apparatus having a plurality of propellers configured to rotate in opposite directions and enclosed within a protective housing.

2. Description of Related Art

There have been many technological advancements in the field of unmanned aerial vehicles (UAV), including drones, within the military and commercial sectors. Although, these advancements focus on improving the amount of weight that each UAV can support and the safety and efficiency of flight. They have failed to adequately address the amount of lift generated by each propeller.

Therefore, what is desired is a simple device that increases the amount of lift generated by propellers for various UAVs by combining multiple propellers rotating in opposite directions using a motor integrated within a single shielded housing.

SUMMARY OF THE INVENTION

The present general inventive concept provides a drone propeller apparatus that includes two or more propellers configured to rotate in opposite directions and enclosed within a circular housing. The drone propeller apparatus is configured to increase and improve air lift.

The drone propeller apparatus according to the present general inventive concept is designed and configured to compound the amount of lift that a single propeller generates by using multiple propellers that rotate in opposite directions. As a result, the amount of lift force is amplified which allows drones (or other aircraft) to elevate and fly quicker than conventional propellers.

The drone propeller apparatus according to the present general inventive concept may also be used to produce improved air circulation when incorporated with conventional ceiling fans. However, the present general inventive concept is not limited thereto.

Certain aspects of the present general inventive concept is achieved by providing a multi-propeller assembly for a drone, the multi-propeller including a housing having a first side and an opposing second side, a motor coupled having a circular cavity surrounded by a plurality of magnets disposed at the opposing second side of the housing, a first three-bladed propeller having a first drive member rotatably coupled within the circular cavity of the motor, the first drive member having a first propeller cavity surrounded by a plurality of magnets, a second three-bladed propeller having a second drive member rotatably coupled within the first propeller cavity, the second drive member having a first propeller cavity surrounded by a plurality of magnets, and a third three-bladed propeller having a third drive member rotatably coupled within the second propeller cavity, the third drive member having a third propeller cavity surrounded by a plurality of magnets, wherein the plurality of magnets of the motor is configured to simultaneously rotate the first and third three-bladed propeller in a first direction and the second three-bladed propeller in an opposite second direction.

The housing may be formed in a circular shape. The multi-propeller assembly of may further comprise a protective mesh member coupled to the first side of the housing.

The first side and the opposing second side of the housing may include a rounded leading edge.

A pitch of each blade of the first, second, and third three-bladed propellers may be adjustable.

BRIEF DESCRIPTIONS OF THE DRAWINGS

These and/or other aspects of the present general inventive concept will become apparent and more readily appreciated from the following description of the embodiments, taken in conjunction with the accompanying drawings of which:

FIG. 10 illustrates a bottom plan view of the motor illustrated in FIG. 9;

Figure 11A:
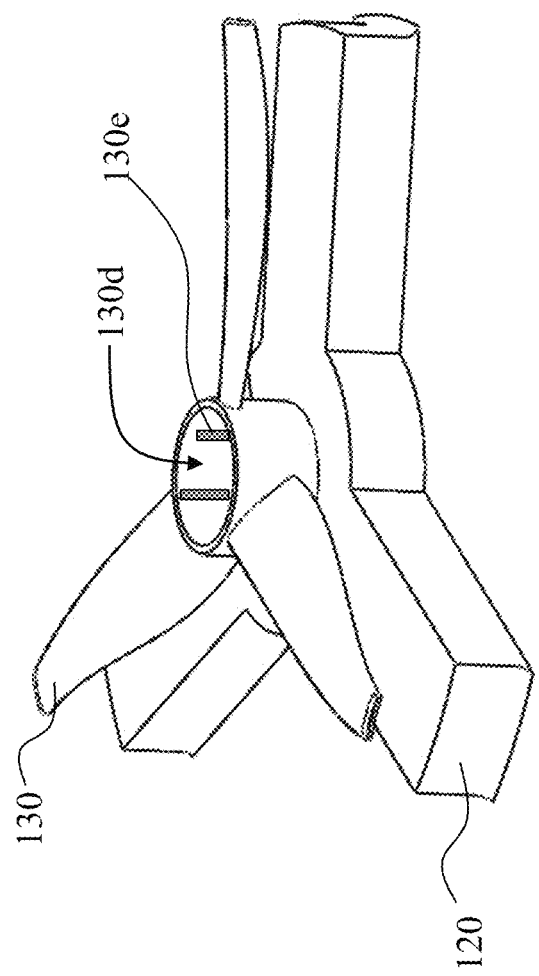
FIG. 11A illustrates a front perspective assembly view of a first three-bladed propeller and a motor of the drone propeller apparatus according to an example embodiment of the present inventive concept.
Figure 11B:
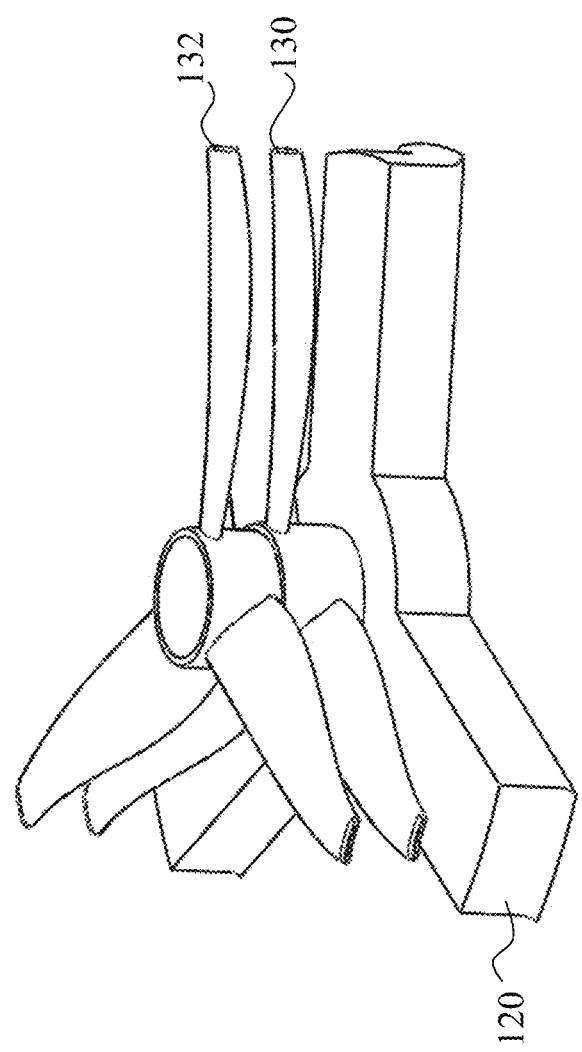
FIG. 11B illustrates a front perspective assembly view of a first and second three-bladed propeller and a motor of the drone propeller apparatus according to an example embodiment of the present inventive concept.
Figure 11C:
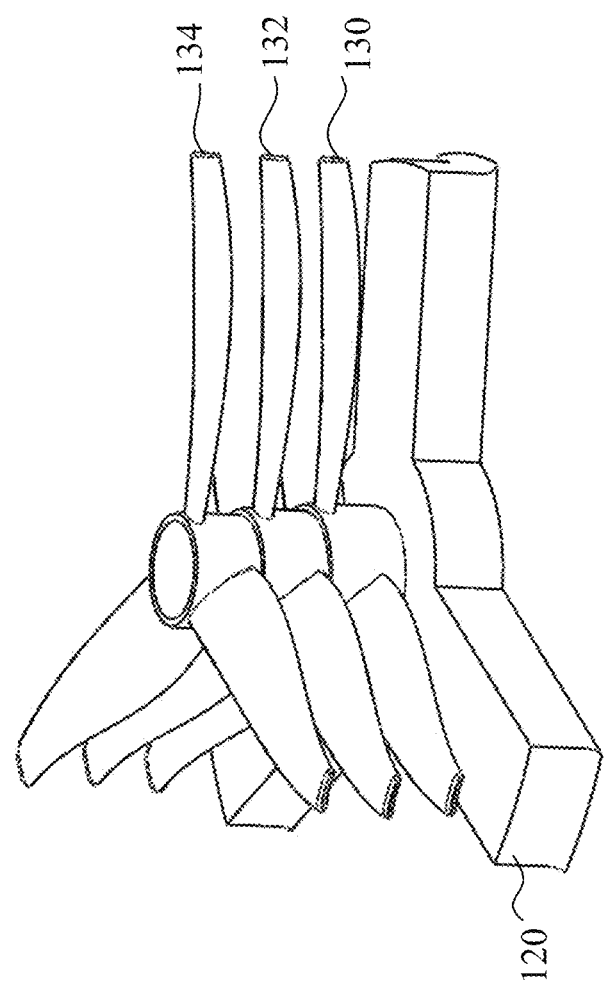
Figure 12:
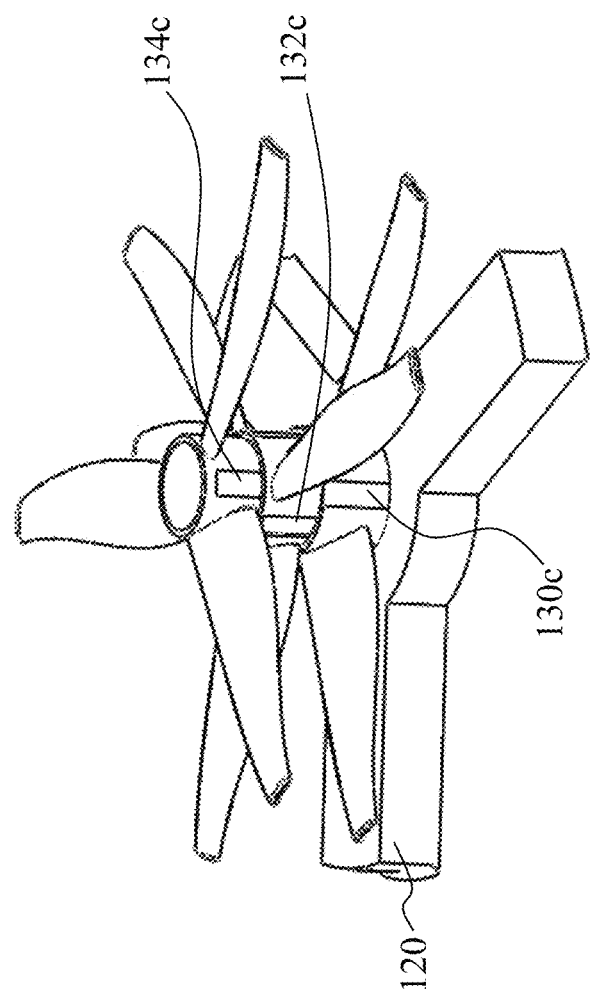

FIG. 11C illustrates a front perspective assembly view of a first, second, and third three-bladed propeller and a motor of the drone propeller apparatus according to an example embodiment of the present inventive concept; and FIG. 12 illustrates a front perspective assembly view of an alignment of the plurality of magnets of the first, second, and third three-bladed propeller and the motor of the drone propeller apparatus illustrated in FIG. 11C.

DESCRIPTION OF INVENTION

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

The drone propeller apparatus according to the present general inventive concept is designed and configured to directionalize and focus the amount of lift force created by a plurality of three-bladed propellers, rotating in opposite directions within a circular housing.

In exemplary embodiments, a motor is integrally formed within the housing such that the coils are disposed within a wall of the housing and the plurality of propellers include magnets which are attracted to and propelled when a current is passed through the coils. However, the present general inventive concept is not limited thereto.

In the present embodiment, the drone propeller apparatus 100 includes a plurality of propellers that are rotatably disposed within the inside of a circular housing member covered by a protective mesh member. The plurality of propellers is rotated by a single motor and may include additional gearing to adjust a speed of the plurality of propellers.

Figure 1:
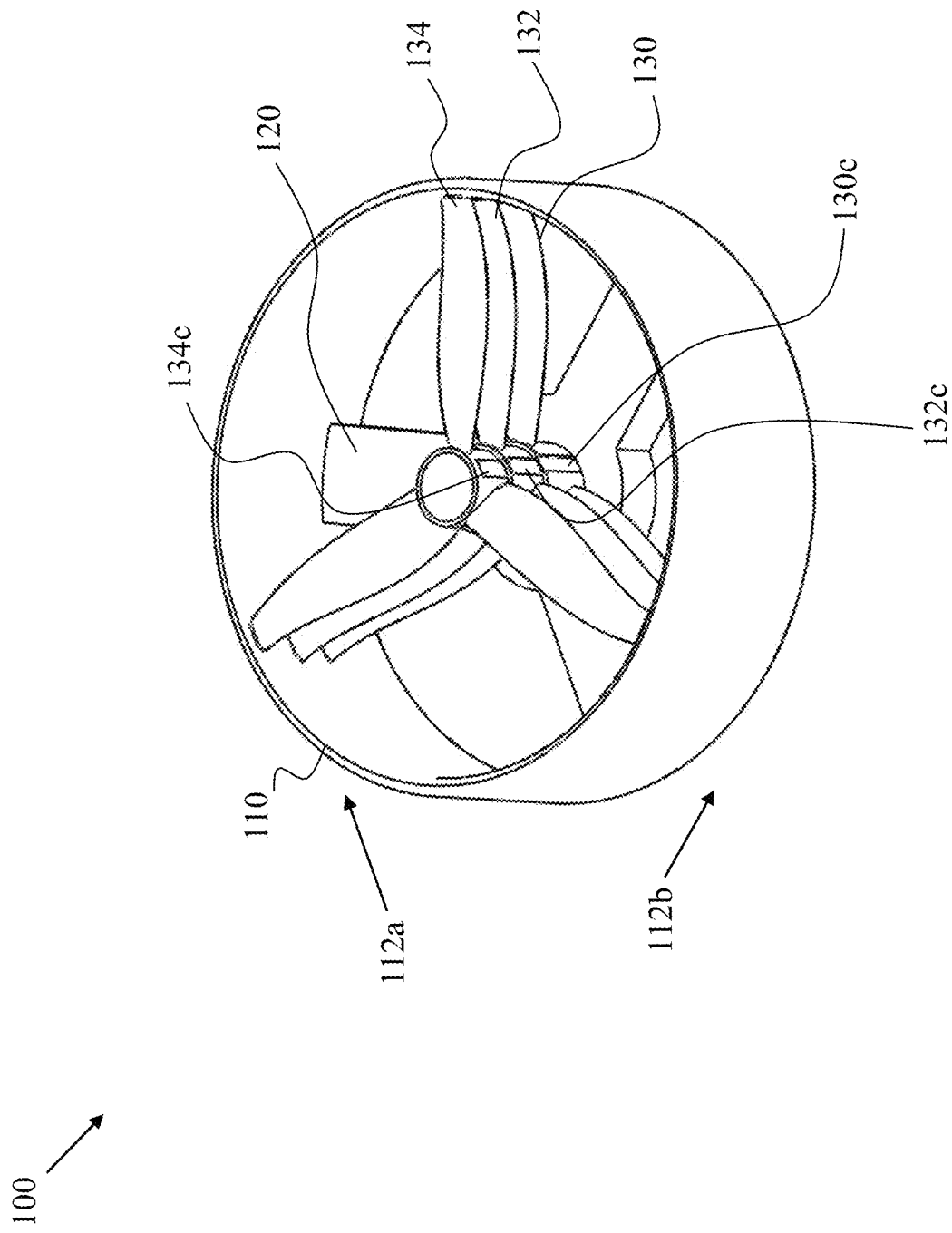
FIG. 1 illustrates a front perspective view of a drone propeller apparatus according to an exemplary embodiment of the present general inventive concept.
Figure 2:
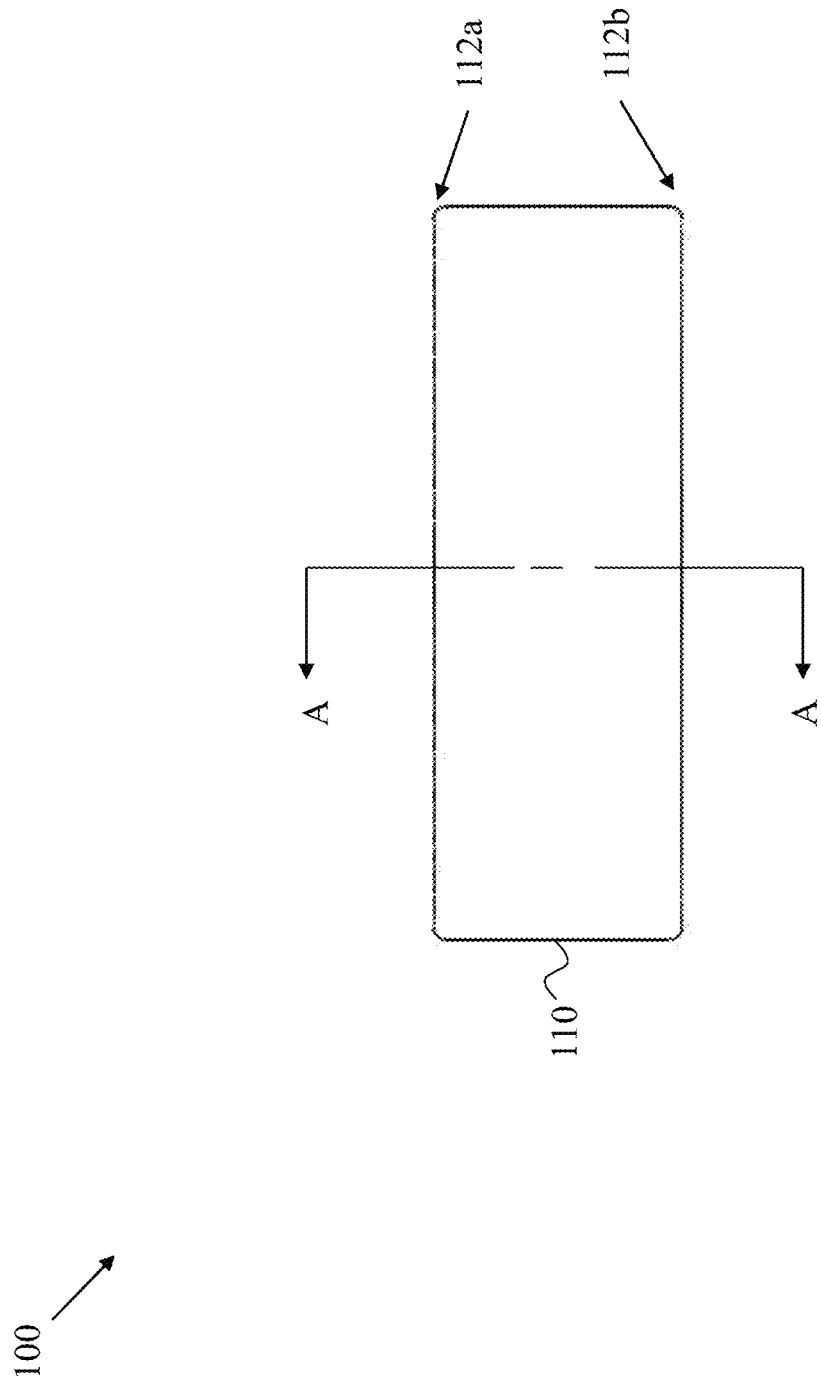
FIG. 2 illustrates a front view of the drone propeller apparatus illustrated in FIG. 1.
Figure 3:
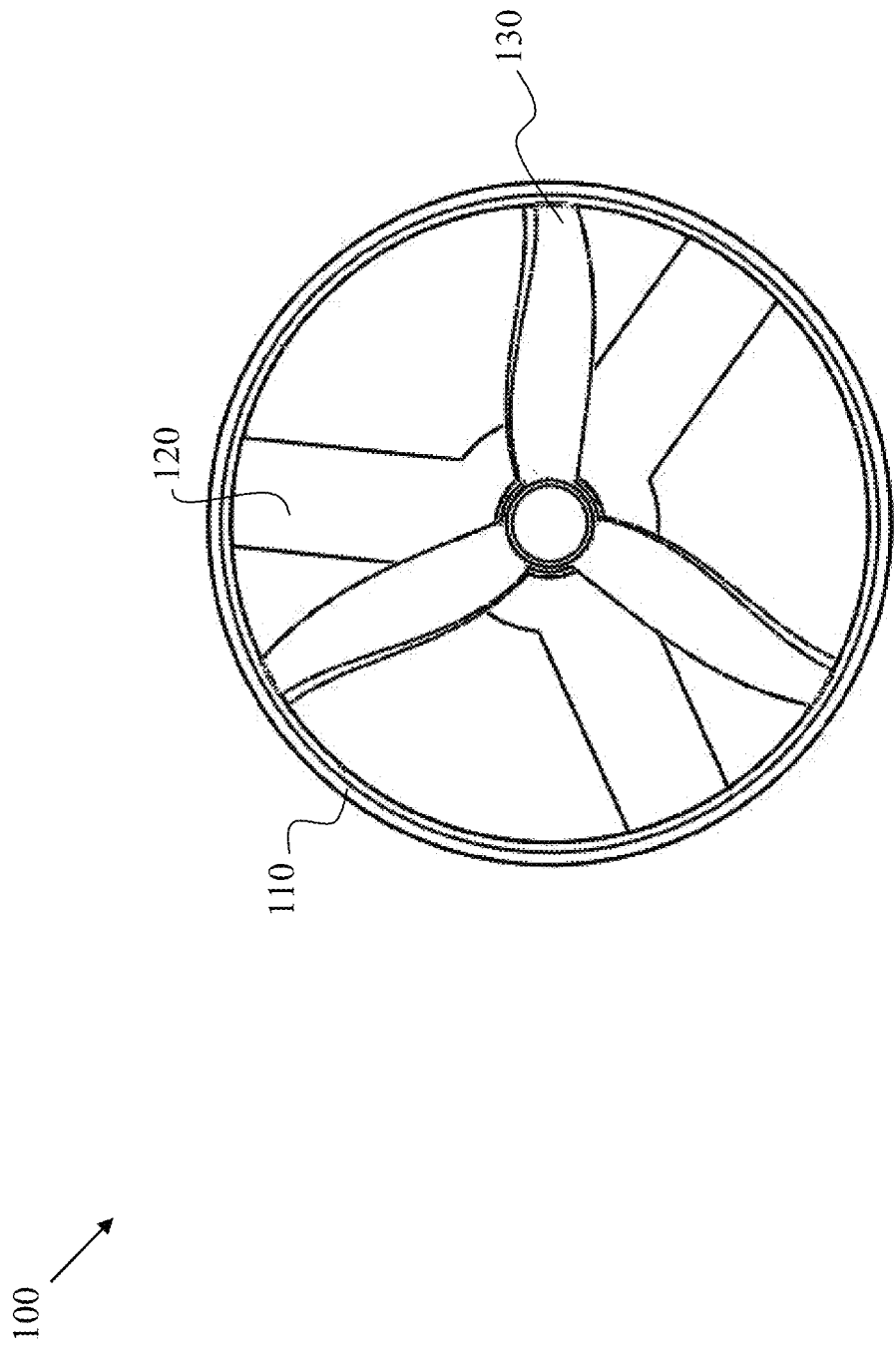
FIG. 3 illustrates a top plan view of the drone propeller apparatus illustrated in FIG. 1.
Figure 4:
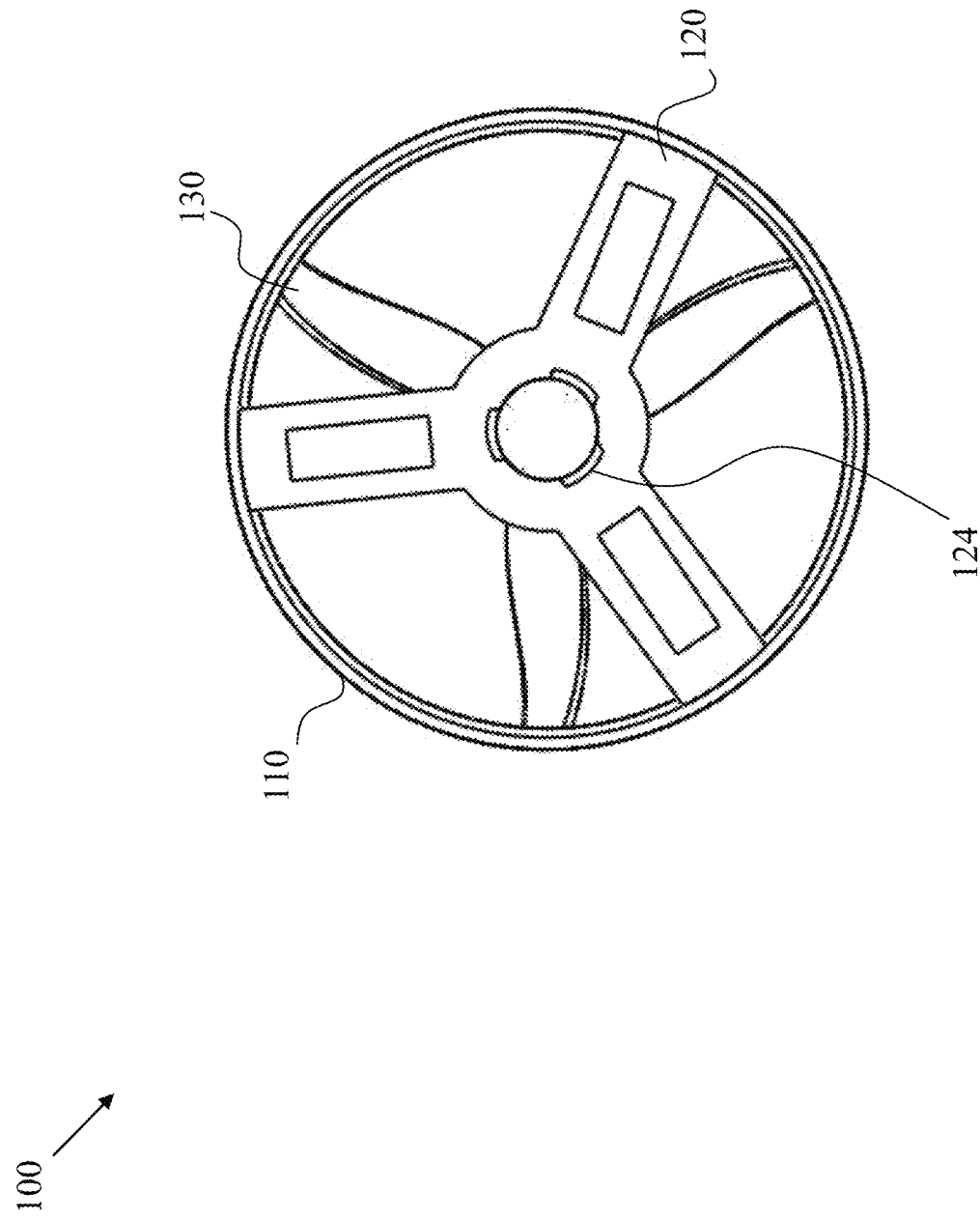
FIG. 4 illustrates a bottom plan view of the drone propeller apparatus illustrated in FIG. 1.
Figure 5:
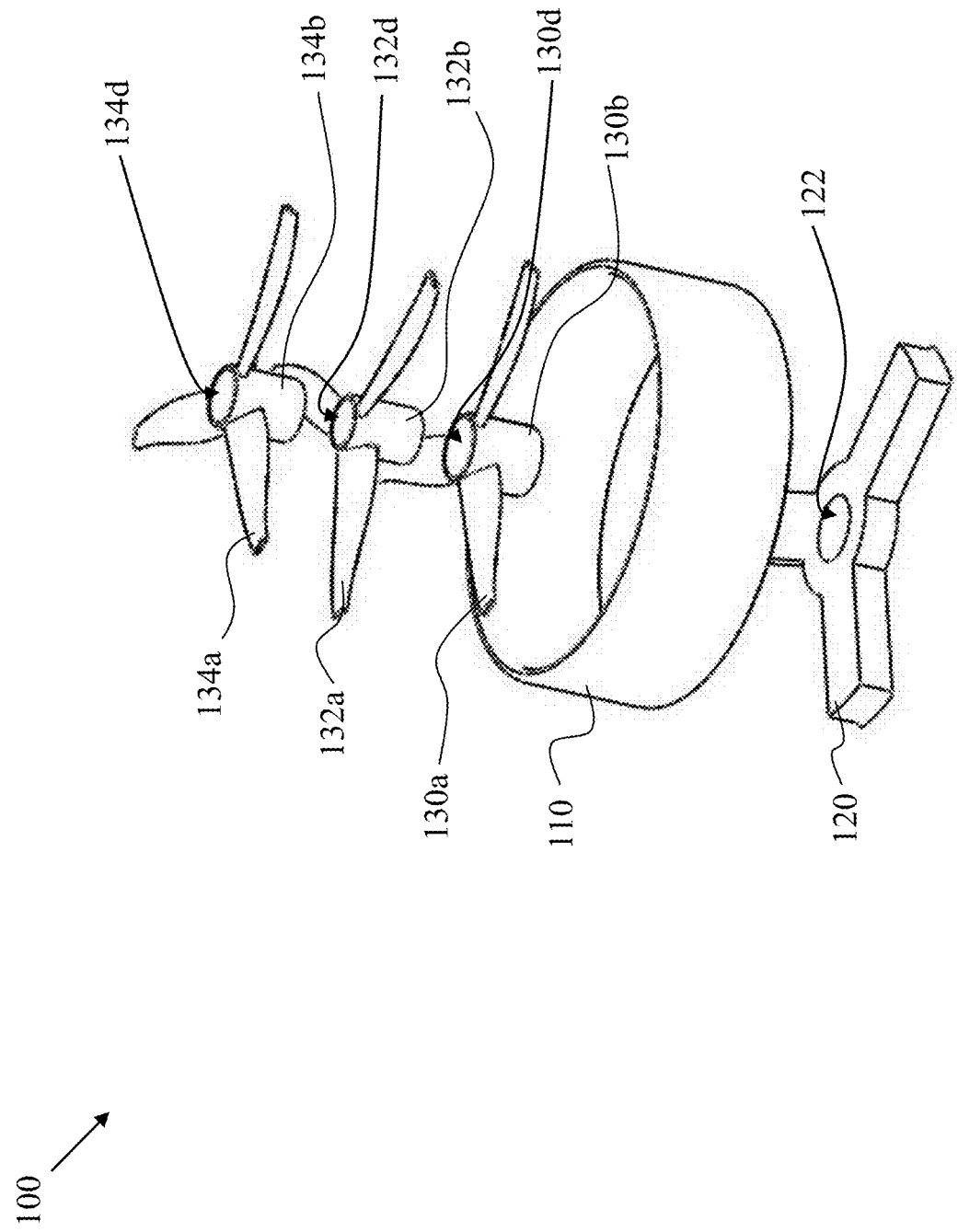
FIG. 5 illustrates an exploded assembly front perspective view of the drone propeller apparatus illustrated in FIG. 1.
Figure 6:
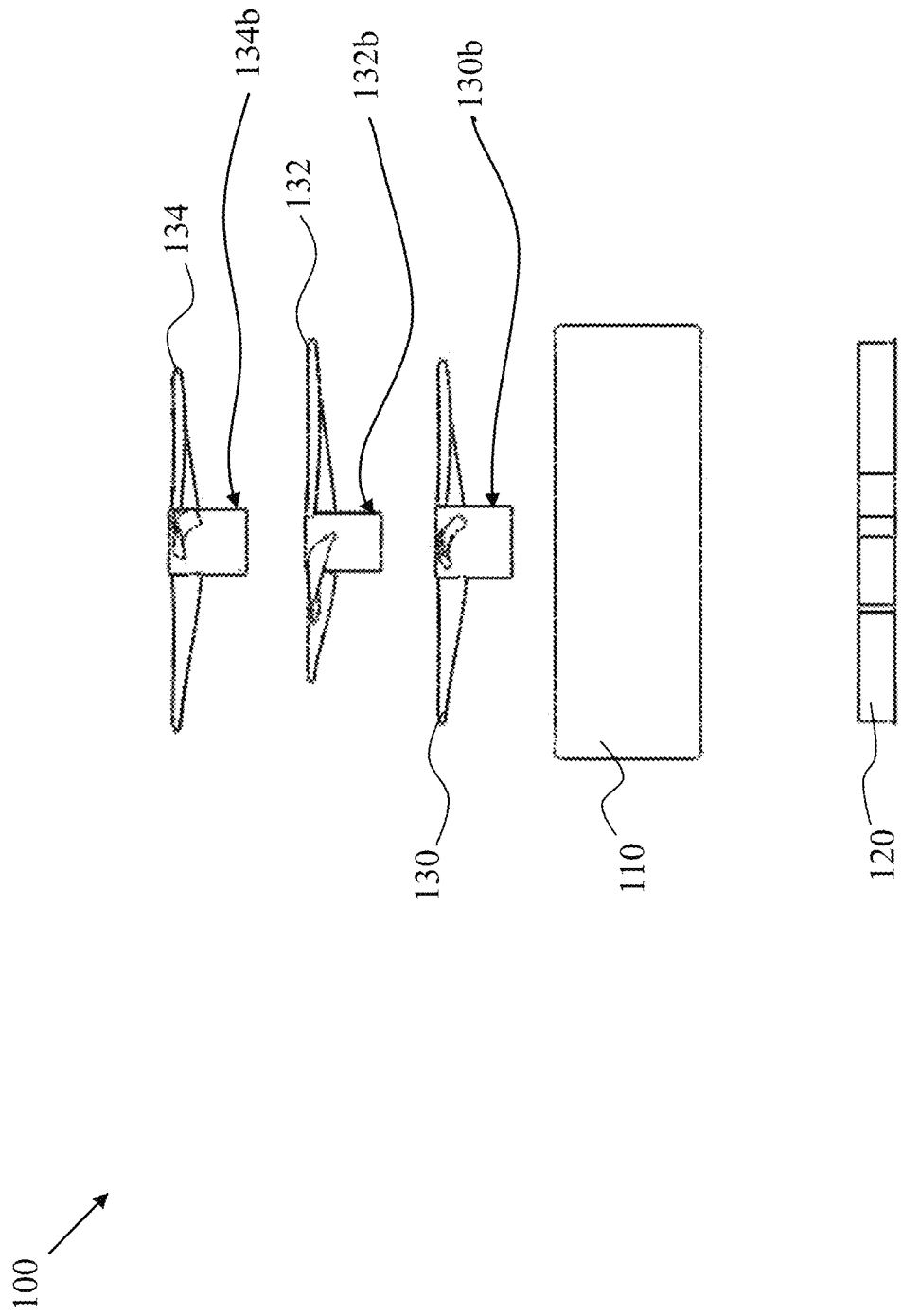
FIG. 6 illustrates a front view of the drone propeller apparatus illustrated in FIG. 5.

FIG. 1 illustrates a front perspective view of a drone propeller apparatus 100 according to an exemplary embodiment of the present general inventive concept, FIG. 2 illustrates a front view of the drone propeller apparatus 100 illustrated in FIG. 1, and FIG. 3 illustrates a top plan view of the drone propeller apparatus 100 illustrated in FIG. 1. FIG. 4 illustrates a bottom plan view of the drone propeller apparatus 100 illustrated in FIG. 1, FIG. 5 illustrates an exploded assembly front perspective view of the drone propeller apparatus 100 illustrated in FIG. 1, and FIG. 6 illustrates a front view of the drone propeller apparatus 100 illustrated in FIG. 5.

Referring to FIGS. 1 through 6, the drone propeller apparatus, designated generally as 100, is illustrated.

In the present embodiment, a multi-propeller assembly for a drone (i.e., drone propeller apparatus) includes a housing 110 having a first side 112*a* and an opposing second side 112*b*, a motor 120 coupled within the housing 110, and a plurality of three-bladed propellers 130 nested within each other.

In the present embodiment, the motor 120 includes a plurality of magnets 124 surrounding a cavity 122 which are used to drive a rotation of the plurality of three-bladed propellers 130.

In the present embodiment, the multi-propeller assembly 100 for a drone or other aircraft includes a first three-bladed propeller 130 having three propellers 130*a* and a first drive member 130*b* designed and configured to fit within the cavity 122 of the motor 120.

The drive member 130*b* includes a plurality of drive magnets 130*c* disposed on an outer surface of the drive member 130*b*. As such, as a voltage is applied to the motor 120, the magnets within the drive member 130*b* are attracted and repelled by the plurality of magnets 124 of the motor 120 thereby causing rotation in a first direction (e.g. clockwise direction). The drive member 130*b* further includes a cavity 130*d* surrounded by a plurality of magnets 130*e*.

In the present embodiment, the first three-bladed propeller 130 has a plurality of propellers 130*a* and a first drive member 130*b* rotatably coupled within the circular cavity 122 of the motor 120. However, the present general inventive concept is not limited thereto.

In exemplary embodiments, the multi-propeller assembly 100 for a drone or other aircraft further includes a second three-bladed propeller 132 having three propellers 132*a* and a second drive member 132*b* designed and configured to fit within the cavity 130*d* of the first drive member 130*b*.

The second drive member 132*b* includes a plurality of drive magnets 132*c* disposed on an outer surface of the drive member 132*b*. As such, as a voltage is applied to the motor 120, the magnets within the second drive member 132*b* are attracted and repelled by the plurality of magnets 124 of the motor 120 and the plurality of magnets of the drive member 130*b*, thereby causing rotation in a second direction (e.g. counter clockwise direction). The second drive member 132*b* further includes a cavity 132*d* surrounded by a plurality of magnets 132*e*.

In exemplary embodiments, the multi-propeller assembly 100 for a drone or other aircraft further includes a third three-bladed propeller 134 having three propellers 134*a* and a third drive member 134*b* designed and configured to fit within the cavity 132*d* of the second drive member 132*b*.

The third drive member 134*b* includes a plurality of drive magnets 134*c* disposed on an outer surface of the drive member 134*b*. As such, as a voltage is applied to the motor 120, the magnets within the third drive member 134*b* are attracted and repelled by the plurality of magnets 124 of the motor 120, the plurality of magnets of the drive member 130*b*, and the plurality of magnets of the second drive member 132*b*, thereby causing rotation in the first direction (e.g. clockwise direction). The third drive member 134*b* further includes a cavity 134*d* surrounded by a plurality of magnets 134*e*.

In the present embodiment, the plurality of magnets within the motor 120, the first, second, and third drive members 130*b*, 132*b*, 134*b* are configured to simultaneously rotate the first and third three-bladed propellers in the first direction (e.g., clockwise direction) and the second three-bladed propeller in an opposite second direction (e.g., counter-clockwise direction). However, the present general inventive concept is not limited thereto.

Figure 7:
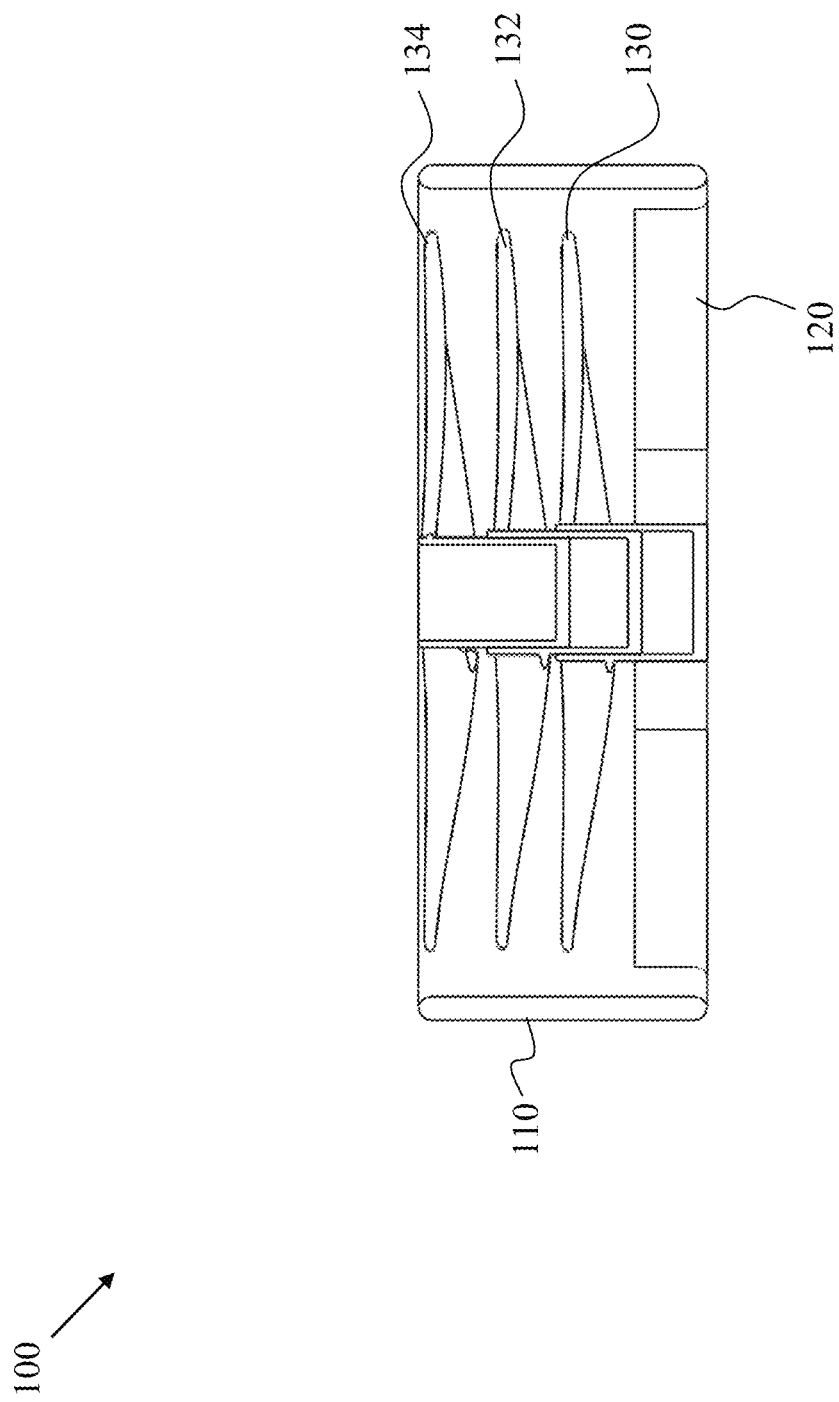
FIG. 7 illustrates a cross-sectional view of the drone propeller apparatus illustrated in FIG. 2, along line A-A.
Figure 8:
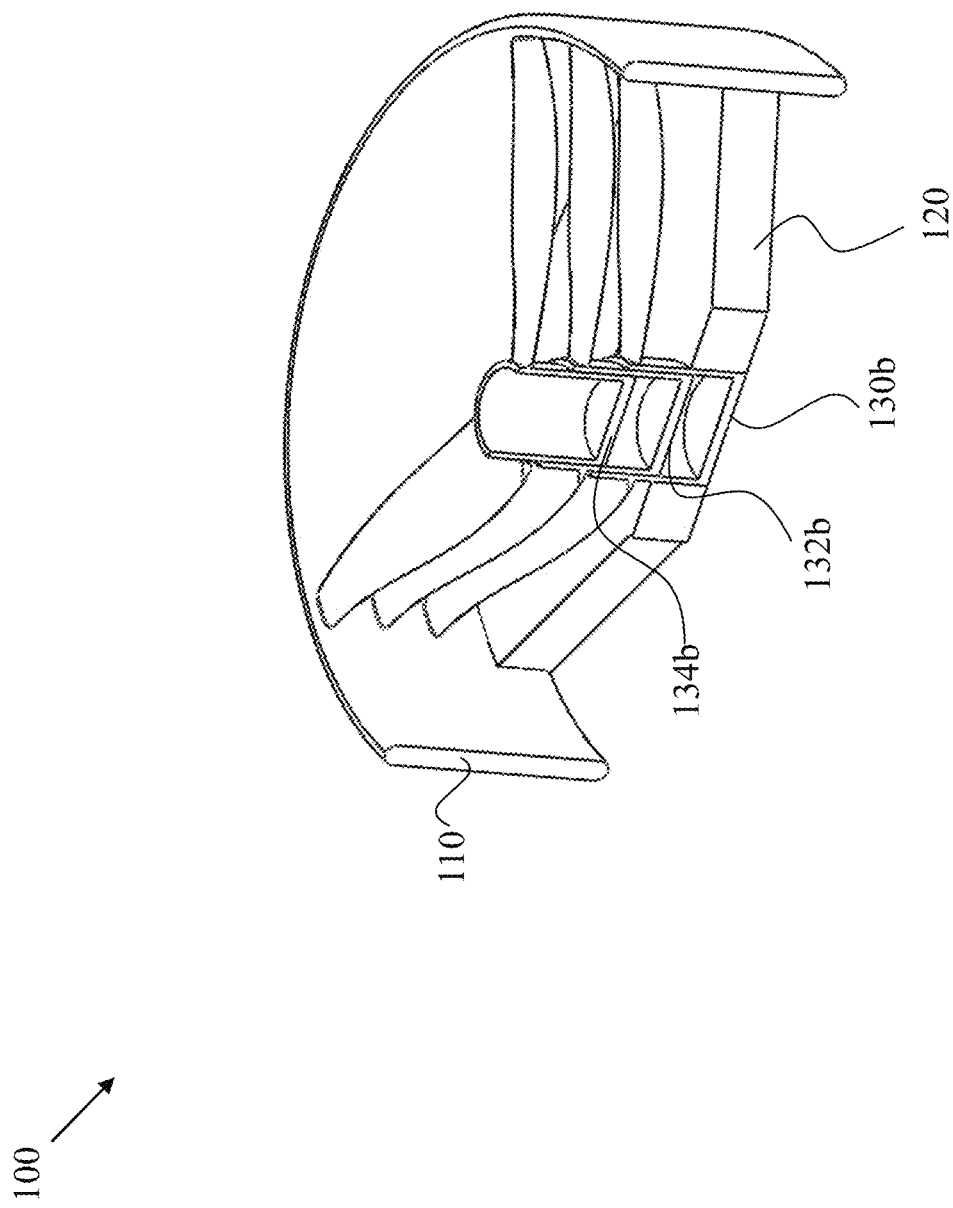
FIG. 8 illustrates a cross-sectional perspective view of the drone propeller apparatus illustrated in FIG. 2.
Figure 9:
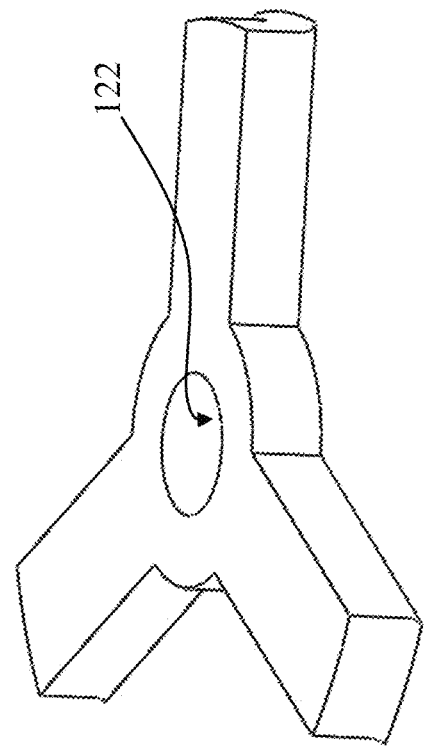
FIG. 9 illustrates a perspective view of a motor of the drone propeller apparatus according to an example embodiment of the present inventive concept.

FIG. 7 illustrates a cross-sectional view of the drone propeller apparatus 100 illustrated in FIG. 2, along line A-A. FIG. 8 illustrates a cross-sectional perspective view of the drone propeller apparatus 100 illustrated in FIG. 2.

Referring to FIGS. 7 and 8, in exemplary embodiments, the multi-propeller assembly 100 for a drone includes a first three-bladed propeller 130 having a first drive member 130*b* nested within a cavity of the motor 120, a second three-bladed propeller 132 having a second drive member 132*b* nested within a cavity of the first drive member 130*b*, and a third three-bladed propeller 134 having a third drive member 134*b* nested within a cavity of the second drive member 132*b*. As such, the rotation of each propeller may be controlled by adjusting a polarity of voltage applied to the motor 120 and each of the drive members.

In alternative embodiments, the multi-propeller assembly for a drone may include a gear member which is configured to rotate a first propeller in a first direction (i.e., clockwise), a second propeller in a second direction (i.e., counter-clockwise), and a third propeller in the first direction (i.e., clockwise). In exemplary embodiments, the drone propeller apparatus 100 includes three or more propellers in order to provide optimum stability and lift. However, the present general inventive concept is not limited thereto.

The circular housing member rotatably supports the plurality of propellers 110, a motor, and the gear member 140 which are used to rotate the propellers 110 to between 500 and 10,000 revolutions per minute (rpm). However, the present general inventive concept is not limited thereto. That is, in alternative embodiments, the circular housing member 120 may support the plurality of propellers 110 to rotate at various rpms, as desired.

The drone propeller apparatus 100 is specifically designed and configured to rotate two or more propellers 110 in opposite directions to increase the amount of lift force generated.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A multi-propeller assembly for a drone, the multi-propeller assembly comprising:
    a housing having a first side and an opposing second side;
    a motor coupled having a circular cavity surrounded by a plurality of magnets disposed at the opposing second side of the housing;
    a first three-bladed propeller having a first drive member rotatably coupled within the circular cavity of the motor, the first drive member having a first propeller cavity surrounded by a plurality of magnets;
    a second three-bladed propeller having a second drive member rotatably coupled within the first propeller cavity, the second drive member having a second propeller cavity surrounded by a plurality of magnets; and
    a third three-bladed propeller having a third drive member rotatably coupled within the second propeller cavity, the third drive member having a third propeller cavity surrounded by a plurality of magnets,
    wherein the plurality of magnets of the motor is configured to simultaneously rotate the first and third three-bladed propeller in a first direction and the second three-bladed propeller in an opposite second direction.

2. The multi-propeller assembly of claim 1, wherein the housing is formed in a circular shape.

3. The multi-propeller assembly of claim 1, further comprising a protective mesh member coupled to the first side of the housing.

4. The multi-propeller assembly of claim 2, wherein the first side and the opposing second side of the housing includes a rounded leading edge.

5. The multi-propeller assembly of claim 1, wherein a pitch of each blade of the first, second, and third three-bladed propellers is adjustable.

* * * * *